US009100923B2

(12) United States Patent
Yamazaki (10) Patent No.: US 9,100,923 B2
(45) Date of Patent: Aug. 4, 2015

(54) RADIO BASE STATION AND COMMUNICATION CONTROL METHOD

(75) Inventor: Chiharu Yamazaki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 233 days.

(21) Appl. No.: 13/578,980

(22) PCT Filed: Feb. 15, 2011

(86) PCT No.: PCT/JP2011/053145
§ 371 (c)(1),
(2), (4) Date: Aug. 14, 2012

(87) PCT Pub. No.: WO2110/099622
PCT Pub. Date: Aug. 18, 2011

(65) Prior Publication Data
US 2012/0329497 A1    Dec. 27, 2012

(30) Foreign Application Priority Data

Feb. 15, 2010    (JP) ................................ 2010-030415

(51) Int. Cl.
*H04B 15/00*    (2006.01)
*H04W 52/24*    (2009.01)
(Continued)

(52) U.S. Cl.
CPC .......... *H04W 52/243* (2013.01); *H04W 28/048* (2013.01); *H04W 24/10* (2013.01); *H04W 52/143* (2013.01); *H04W 72/0426* (2013.01)

(58) Field of Classification Search
CPC ... H04W 24/10; H04W 28/048; H04W 28/08; H04W 52/00; H04W 52/0206; H04W 52/04; H04W 52/14; H04W 52/143; H04W 52/146; H04W 52/243; H04W 52/245; H04W 52/26; H04W 52/38

USPC .......... 455/501, 522, 69, 452, 63, 446, 67.13, 455/509, 127.1, 130, 452.2, 512, 101, 450, 455/63.1, 423, 452.1, 453, 443, 67.11, 561; 370/328, 329, 335, 252, 210, 330, 235
See application file for complete search history.

(56) References Cited

U.S. PATENT DOCUMENTS

2002/0042276 A1*  4/2002  Hakalin et al. ................. 455/453
2003/0214915 A1* 11/2003  Ishikawa ....................... 370/252
(Continued)

FOREIGN PATENT DOCUMENTS

JP    05-030022    2/1993

OTHER PUBLICATIONS

Telecom Italia et al.; Way forwad on UL ICIC/Overload Indicator for LTE; 3GPP TSG RAN WG1 #51 R1-075050; Nov. 5-9, 2007.
(Continued)

*Primary Examiner* — Tan Trinh
(74) *Attorney, Agent, or Firm* — Studebaker & Brackett PC (57) ABSTRACT

A first radio base station (1A) calculates a traffic amount ratio in the first radio base station (1A). Further, when the traffic amount ratio is equal to or greater than a threshold value, the first radio base station (1A) controls to transmit interference information. Under this control, the first radio base station (1A) performs a measurement of interference power, a generation of the interference information and the transmission of the interference information to a second radio base station (1B). On the other hand, when the traffic amount ratio is less than the threshold value, the first radio base station (1A) controls to halt the transmission of the interference information. Under this control, the first radio base station (1A) performs none of the measurement of interference power, the generation of the interference information and the transmission of the interference information to the second radio base station (1B).

6 Claims, 7 Drawing Sheets

| FIRST INTERFERENCE INFORMATION | SECOND INTERFERENCE INFORMATION | TRAFFIC VOLUME RATIO | CONTROL OF TRANSMITTING SECOND INTERFERENCE INFORMATION |
|---|---|---|---|
| 1 | 0 | ALL VALUES | TRANSMIT |
| 1 | 1 | LESS THAN THRESHOLD VALUE | TRANSMIT 0 AS SECOND INTERFERENCE INFORMATION |
| 1 | 1 | EQUAL TO OR MORE THAN THRESHOLD VALUE | STOP TRANSMISSION |
| 0 | 0 | ALL VALUES | STOP TRANSMISSION |
| 0 | 1 | LESS THAN THRESHOLD VALUE | STOP TRANSMISSION |
| 0 | 1 | EQUAL TO OR MORE THAN THRESHOLD VALUE | TRANSMIT |

(51) Int. Cl.
*H04W 28/04* (2009.01)
*H04W 24/10* (2009.01)
*H04W 72/04* (2009.01)
*H04W 52/14* (2009.01)

(56) References Cited

U.S. PATENT DOCUMENTS

| | | | |
|---|---|---|---|
| 2004/0048587 A1* | 3/2004 | Diao et al. | 455/127.1 |
| 2006/0229089 A1* | 10/2006 | Tokgoz et al. | 455/501 |
| 2008/0146154 A1* | 6/2008 | Claussen et al. | 455/63.1 |
| 2009/0088176 A1* | 4/2009 | Teo et al. | 455/452.1 |
| 2009/0143070 A1* | 6/2009 | Shu et al. | 455/450 |
| 2009/0196245 A1* | 8/2009 | Ji | 370/329 |
| 2009/0245331 A1* | 10/2009 | Palanki et al. | 375/148 |
| 2009/0247181 A1* | 10/2009 | Palanki et al. | 455/452.2 |
| 2010/0034146 A1* | 2/2010 | Hou et al. | 370/328 |
| 2010/0087149 A1* | 4/2010 | Srinivasan et al. | 455/63.1 |
| 2010/0087221 A1* | 4/2010 | Srinivasan et al. | 455/522 |
| 2010/0091893 A1* | 4/2010 | Gorokhov | 375/260 |
| 2010/0151876 A1* | 6/2010 | Park et al. | 455/452.2 |
| 2010/0220682 A1* | 9/2010 | Tao et al. | 370/330 |
| 2010/0248736 A1* | 9/2010 | Hulkkonen et al. | 455/452.2 |
| 2011/0014909 A1* | 1/2011 | Han et al. | 455/423 |
| 2011/0149894 A1* | 6/2011 | Luo et al. | 370/329 |
| 2011/0170496 A1* | 7/2011 | Fong et al. | 370/329 |
| 2011/0199986 A1* | 8/2011 | Fong et al. | 370/329 |
| 2011/0217985 A1* | 9/2011 | Gorokhov | 455/452.2 |
| 2011/0235515 A1* | 9/2011 | Dreyfus et al. | 370/235 |
| 2012/0021753 A1* | 1/2012 | Damnjanovic et al. | 455/450 |
| 2014/0226630 A1* | 8/2014 | Comstock | 370/331 |

OTHER PUBLICATIONS

International Search Report; PCT/JP2011/053145; May 24, 2011.

* cited by examiner

FIG. 9

RADIO BASE STATION AND COMMUNICATION CONTROL METHOD

TECHNICAL FIELD

The present invention relates to a radio base station that performs a process of allowing other radio base station to control interference from a radio terminal connected to the other radio base station, and a communication control method in the radio base station.

BACKGROUND ART

In a radio communication system, when uplink radio communication from a radio terminal to a radio base station serving as a connection destination is performed, interference to neighboring radio base stations from the radio terminal is controlled (for example, refer to Patent Literature 1).

The same control is performed in LTE (Long Term Evolution) which is a 3GPP standard. In the LTE, information on an interference state called OI (Overload Indicator) is exchanged among radio base stations, so that one radio base station is considered to control interference (uplink interference from neighboring cells) from a radio terminal connected to neighboring radio base stations.

Specifically, one radio base station measures uplink interference power from the neighboring cells in units of radio resources called resource blocks (RBs), and transmits information of three values, which indicate "small interference", "large interference", and "very large interference", according to the interference power, to the neighboring radio base stations. The neighboring radio base stations having received the information of three values can control transmission power (uplink transmission power) of connected radio terminals by using the information of three values. For example, when information indicating that the interference power is "very large" is received, the neighboring radio base stations control the radio terminals to reduce the uplink transmission power, thereby reducing uplink interference power in one radio base station.

PRIOR ART DOCUMENT

Patent Document

Patent Document 1: Japanese Unexamined Patent Application Publication No. H05-30022

SUMMARY OF THE INVENTION

However, in order to distribute the load of radio communication, in the case of configuring a heterogeneous radio communication system in which a large number of different types of base stations are located, a micro cell radio communication system and the like, since traffic is not uniformly generated in all the base stations, traffic is considered to be very low in some base stations. When such a base station with the very low traffic transmits OI according to only uplink interference power from neighboring cells as described above, neighboring radio base stations may perform control of reducing uplink transmission power more than necessary, resulting in a reduction of the overall communication capacity of the radio communication system.

Therefore, the object of the present invention is to provide a radio base station and a communication control method, which prevent a reduction of the overall communication capacity of a radio communication system.

To solve the above problem, the present invention has following features. A first feature of the present invention is summarized as a radio base station (first radio base station 1A), which performs a process of allowing other radio base station (second radio base station 1B) to control interference from a radio terminal connected to the other radio base station, comprising: an interference information transmission control unit (transmission control unit 156) configured to control transmission of interference information to the other radio base station based on a load of radio communication in the radio base station, the interference information being associated with interference power from the radio terminal.

Such a radio base station controls the transmission of the interference information associated with the power of the interference from the radio terminal based on the load of the radio communication in the radio base station. In this way, the communication load in the radio base station is reflected in whether the radio base station transmits the interference information, so that it is possible for other radio base station to control the transmission power of the radio terminal connected to the other radio base station, based on the interference information having reflected the load of the radio communication in the radio base station serving as a transmission source of the interference information. Consequently, it is possible to prevent a reduction of the overall communication capacity of the radio communication system due to a reduction of the transmission power more than necessary.

A second feature of the present invention is summarized as that the interference information transmission control unit performs control of transmitting the interference information when a value indicating the load of radio communication is equal to or more than a threshold value, and performs control of stopping transmission of the interference information when the value indicating the load of radio communication is smaller than the threshold value.

A third feature of the present invention is summarized as the radio base station further comprising: an interference information generation unit (interference information generation unit 154) configured to generate the interference information, wherein the interference information generation unit generates the interference information when the control of transmitting the interference information is performed by the interference information transmission control unit, and stops generation of the interference information when the control of stopping the transmission of the interference information is performed by the interference information transmission control unit.

A fourth feature of the present invention is summarized as the radio base station further comprising: an interference power measurement unit (interference power measurement unit 150) configured to measure the interference power, wherein the interference power measurement unit measures the interference power when the control of transmitting the interference information is performed by the interference information transmission control unit, and stops measurement of the interference power when the control of stopping the transmission of the interference information is performed by the interference information transmission control unit.

A fifth feature of the present invention is summarized as that the interference information transmission control unit performs the control of transmitting the interference information when a value indicating the load of the radio communication is equal to or more than a threshold value and the interference information corresponds to a first index value indicating that the corresponding interference power is equal to or more than a predetermined value, and performs the control of stopping the transmission of the interference information when performs the control of stopping the transmission of the interference information when any one of conditions is satisfied, the conditions being that the value indicating the load of the radio communication is less than the threshold value and that the interference information is a second index value indicating that the corresponding interference power is less than the predetermined value.

A sixth feature of the present invention is summarized as the radio base station further comprising: an interference information generation unit configured to generate first interference information and second interference information, wherein the interference information transmission control unit performs control of transmitting the second interference information when the first interference information corresponds to a first index value indicating that the corresponding interference power is equal to or more than a predetermined value and the second interference information corresponds to a second index value indicating that the corresponding interference power is smaller than the predetermined value, performs the control of transmitting the second index value as the second interference information when the first interference information corresponds to the first index value, the second interference information corresponds to the first index value, and the value indicating the load of the radio communication is smaller than the threshold value, performs control of stopping transmission of the second interference information when the first interference information corresponds to the first index value, the second interference information corresponds to the first index value, and the value indicating the load of the radio communication is equal to or more than the threshold value, performs the control of stopping the transmission of the second interference information when the first interference information corresponds to the second index value and the second interference information corresponds to the second index value, performs the control of stopping the transmission of the second interference information when the first interference information corresponds to the second index value, the second interference information corresponds to the first index value, and the value indicating the load of the radio communication is smaller than the threshold value, and performs the control of transmitting the second interference information when the first interference information corresponds to the second index value, the second interference information corresponds to the first index value, and the value indicating the load of the radio communication is equal to or more than the threshold value.

A seventh feature of the present invention is summarized as a communication control method in a radio base station, which performs a process of allowing other radio base station to control interference from a radio terminal connected to the other radio base station, comprising: a step of measuring, at the radio base station, a load of radio communication in the radio base station; a step of measuring, at the radio base station, interference power from the radio terminal; a step of generating, at the radio base station, interference information associated with the measured interference power; and a step of controlling, at the radio base station, transmission of the generated interference information to the other radio base station based on the measured load of the radio communication.

According to the present invention, it is possible to prevent a reduction of the overall communication capacity of a radio communication system.

MODES FOR CARRYING OUT THE INVENTION

Next, an embodiment of the present invention will be described with reference to the drawings. Specifically, the embodiment of the present invention will be described in sequence of (1) Configuration of radio communication system, (2) Operation of radio base station, (3) Operation and effect, and (4) Other embodiments. It is to be noted that the same or similar reference numerals are applied to the same or similar parts through the drawings in the following embodiments.

Figure 1:
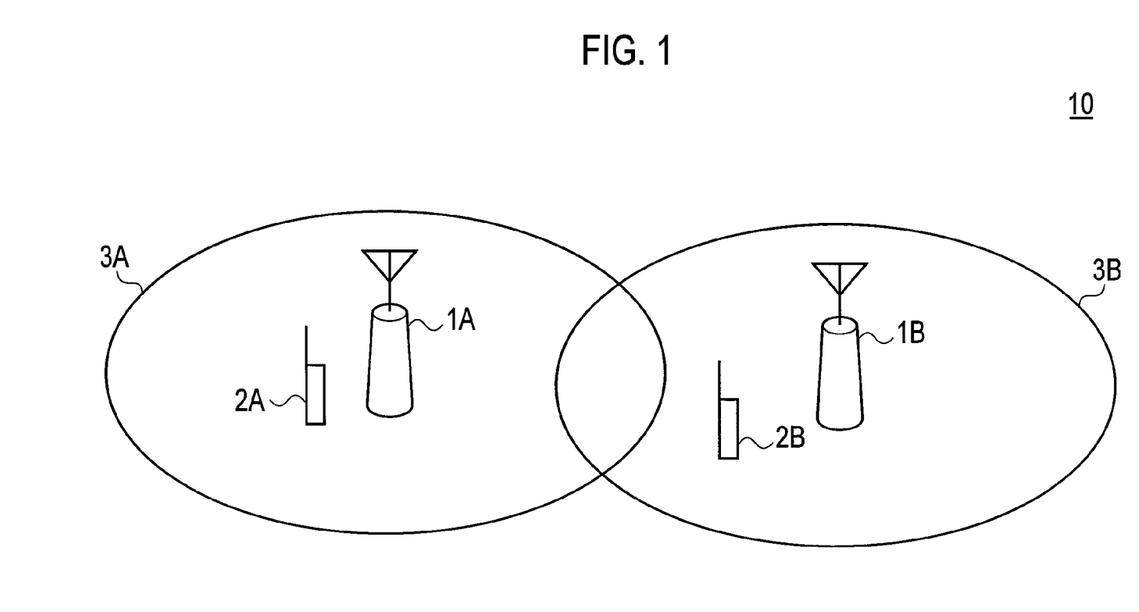
FIG. 1 is a diagram showing the entire schematic configuration of a radio communication system according to an embodiment of the present invention.

(1) Configuration of Radio Communication System (1.1) Entire Schematic Configuration of Radio Communication System FIG. 1 is a diagram showing the entire schematic configuration of a radio communication system 10 according to an embodiment of the present invention. The radio communication system 10, for example, has a configuration based on the LTE Release 9 which is a 3.9th generation (3.9G) cellular phone system, or the LTE-Advanced positioned as a 4th generation (4G) cellular phone system.

As shown in FIG. 1, the radio communication system 10 includes a first radio base station 1A configured to form a cell 3A and a second radio base station 1B configured to form a cell 3B. The radiuses of the cell 3A and the cell 3B, for example, are about several hundreds [m]. A radio terminal 2A existing in the cell 3A is connected to the first radio base station 1A, and a radio terminal 2B existing in the cell 3B is connected to the second radio base station 1B.

The first radio base station 1A and the second radio base station 1B are installed at places based on a cell site design in which a communication provider has considered inter-cell interference.

The first radio base station 1A and the second radio base station 1B are connected to each other through a dedicated line and the like (including a radio connection) not shown, and an X2 interface serving as a logical transmission path of a transport layer has been established therebetween.

The first radio base station 1A is configured to assign one or a plurality of uplink or downlink resource blocks (RBs), which are radio sources of a minimum assignment unit, to the radio terminal 2A, thereby performing radio communication with the radio terminal 2A. In the same manner, the second radio base station 1B is configured to assign one or a plurality of uplink or downlink resource blocks to the radio terminal 2B, thereby performing radio communication with the radio terminal 2B.

When a frequency band of a resource block corresponding to an uplink (a link from the radio terminal 2A to the first radio base station 1A, hereinafter, referred to as a "first uplink"), which is used in the radio communication in a case in which the first radio base station 1A and the radio terminal 2A are connected to perform the radio communication with each other, is equal to a frequency band of a resource block corresponding to an uplink (a link from the radio terminal 2B to the second radio base station 1B, hereinafter, referred to as a "second uplink") which is used in the radio communication in a case in which the second radio base station 1B and the radio terminal 2B are connected to perform the radio communication with each other, the first radio base station 1A performing the radio communication with the radio terminal 2A is interfered by a radio signal transmitted from the radio terminal 2B to the second radio base station 1B through the second uplink.

In the present embodiment, the first radio base station 1A is interfered by the radio terminal 2B as described above, the first radio base station 1A requests the second radio base station 1B to control the transmission power of the radio terminal 2B, and the second radio base station 1B controls the transmission power of the radio terminal 2B in response to the request to reduce the interference.

(1.2) Configuration of First Radio Base Station 1A

Figure 2:
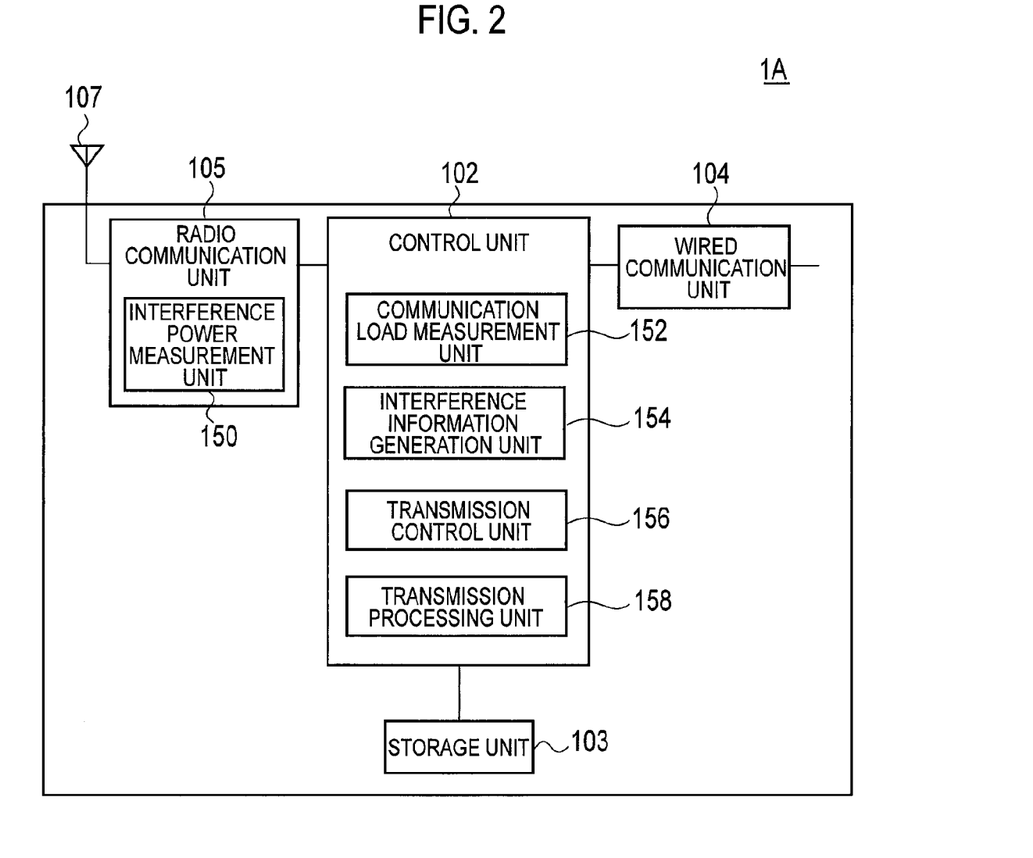
FIG. 2 is a configuration diagram of a first radio base station according to the embodiment of the present invention.

FIG. 2 is a block diagram showing the configuration of the first radio base station 1A. As shown in FIG. 2, the first radio base station 1A includes a control unit 102, a storage unit 103, a wired communication unit 104, a radio communication unit 105, and an antenna unit 107.

The control unit 102, for example, is configured by CPU, and controls various functions of the first radio base station 1A. The storage unit 103, for example, is configured by a memory, and stores various types of information used for the control and the like of the first radio base station 1A.

The wired communication unit 104 is configured to transmit and receive data to and from the second radio base station 1B. The radio communication unit 105, for example, is configured using a radio frequency (RF) circuit, a baseband (BB) circuit and the like, and transmits and receives a radio signal to and from the radio terminal 2A through the antenna unit 107. Furthermore, the radio communication unit 105 is configured to encode and modulate a transmission signal, and demodulate and decode a reception signal. Moreover, the radio communication unit 105 is configured to output reception data, which is obtained by demodulating and decoding the reception signal, to the control unit 102.

The radio communication unit 105 includes an interference power measurement unit 150. The control unit 102 includes a communication load measurement unit 152, an interference information generation unit 154, a transmission control unit 156, and a transmission processing unit 158.

The interference power measurement unit 150 of the radio communication unit 105 is configured to measure power of interference caused by radio signals transmitted from the ratio terminal 2B to the second radio base station 1B through the second uplink, while the first radio base station 1A is receiving radio signals transmitted from the ratio terminal 2A through the first uplink. Specifically, the interference power measurement unit 150 is configured to measure power of components of the radio signals, which are transmitted from the ratio terminal 2B to the second radio base station 1B through the second uplink among the received radio signals, in each of the one or plurality of resource blocks assigned to the radio terminal 2A.

The communication load measurement unit 152 of the control unit 102 is configured to calculate a ratio (a traffic volume ratio) of actual traffic volume with respect to maximum traffic volume, which is processible by the first radio base station 1A, as a load of radio communication in the first radio base station 1A.

Specifically, the communication load measurement unit 152 is configured to measure the amount of transmission data output from the control unit 102 to the radio communication unit 105. Moreover, the communication load measurement unit 152 is configured to calculate the traffic volume ratio by dividing the measured amount of transmission data by prescribed processible downlink traffic volume at maximum.

Alternatively, the communication load measurement unit 152 is configured to measure the amount of reception data output from the radio communication unit 105 to the control unit 102. Moreover, the communication load measurement unit 152 is configured to calculate the traffic volume ratio by dividing the measured amount of reception data by prescribed processible uplink traffic volume at maximum.

The processible downlink traffic volume at maximum or the processible uplink traffic volume at maximum is stored in the storage unit 103. In addition, the communication load measurement unit 152 may correct the calculated traffic volume ratio to be large as throughput requested in the radio communication between the first radio base station 1A and the radio terminal 2A, or a requested data amount is large.

The interference information generation unit 154 of the control unit 102 is configured to generate interference information of two values, which indicate "0" and "1" as OI (Overload Indicator), based on an interference power value of each resource block measured by the interference power measurement unit 150. Specifically, when the interference power value of each resource block is equal to or more than a predetermined value, the interference information generation unit 154 generates "1" indicating large interference as the interference information. When the interference power value of each resource block is smaller than the predetermined value, the interference information generation unit 154 generates "0" indicating small interference as the interference information. Here, the predetermined value is stored in the storage unit 103 in advance.

The transmission control unit 156 of the control unit 102 is configured to control the transmission of the interference information to the second radio base station 1B by the transmission processing unit 158. Specifically, the transmission control unit 156 is configured to perform the following first to third transmission control.

(First Transmission Control)

In the first transmission control, the transmission control unit 156 determines whether the traffic volume ratio is equal to or more than a threshold value. Here, the threshold value is stored in the storage unit 103 in advance. When the traffic volume ratio is equal to or more than the threshold value, even though the first radio base station 1A changes resource blocks to be assigned to the radio terminal 2A, it is difficult to avoid interference or maintain a required communication speed. In this case, the transmission control unit 156 performs the control of transmitting the interference information to the second radio base station 1B. Meanwhile, when the traffic volume ratio is smaller than the threshold value, the first radio base station 1A changes the resource blocks to be assigned to the radio terminal 2A, so that it is possible to avoid the interference or maintain the required communication speed. In this case, the transmission control unit 156 performs the control of stopping the transmission of the interference information to the second radio base station 1B.

When the control of transmitting the interference information to the second radio base station 1B is performed by the transmission control unit 156, the following processes are performed. That is, the interference power measurement unit 150 performs the aforementioned measurement of the interference power. Furthermore, the interference information generation unit 154 performs the aforementioned generation of the interference information.

Moreover, the transmission processing unit 158 transmits the interference information generated by the interference information generation unit 154 to the second radio base station 1B, under the control of the transmission control unit 156.

Specifically, the transmission processing unit 158 extracts identification information of the radio terminal 2B serving as a transmission source of a radio signal and identification information of the second radio base station 1B serving as a transmission destination of the radio signal, which are included in reception data corresponding to the radio signal transmitted from the radio terminal 2B to the second radio base station 1B through the second uplink. Next, the transmission processing unit 158 adds identification information of a resource block, which corresponds to the interference information of each resource block generated by the interference information generation unit 154, and the extracted identification information of the radio terminal 2B to the interference information. Moreover, the transmission processing unit 158 sets a transmission destination of the interference information of each resource block as the extracted identification information of the second radio base station 1B, and transmits interference information including the identification information of the resource block and the identification information of the radio terminal 2B to the second radio base station 1B through the wired communication unit 104.

Meanwhile, when the control of stopping the transmission of the interference information to the second radio base station 1B is performed by the transmission control unit 156, the interference power measurement unit 150 stops the aforementioned measurement of the interference power. Furthermore, the interference information generation unit 154 stops the aforementioned generation of the interference information. Moreover, the transmission processing unit 158 stops the transmission of the interference information to the second radio base station 1B, under the control of the transmission control unit 156.

(Second Transmission Control)

The second transmission control is transmission control when it is regarded that no interference occurs in the first radio base station 1A because the second radio base station 1B periodically receives no interference information.

In the second transmission control, the transmission control unit 156 determines whether the traffic volume ratio is equal to or more than the threshold value and the interference information indicates "1". When the traffic volume ratio is equal to or more than the threshold value and the interference information indicates "1", the number of resource blocks assignable by the first radio base station 1A is small and interference is large. In this case, even though, for example, the first radio base station 1A changes resource blocks to be assigned to the radio terminal 2A, it is difficult to avoid interference or maintain a required communication speed. Thus, it is necessary to reduce the interference by performing control in which the second radio base station 1B reduces the transmission power of the radio terminal 2B. Therefore, the transmission control unit 156 performs the control of transmitting the interference information "1" to the second radio base station 1B to request a reduction of the transmission power of the radio terminal 2B.

Meanwhile, when the traffic volume ratio is smaller than the threshold value, the number of resource blocks assignable by the first radio base station 1A is large. In this case, the first radio base station 1A changes the resource blocks to be assigned to the radio terminal 2A, so that it is possible to avoid the interference. Furthermore, when the interference information indicates "0", the interference is small. Thus, it is not necessary to reduce the interference by performing the control in which the second radio base station 1B reduces the transmission power of the radio terminal 2B. Therefore, when the traffic volume ratio is smaller than the threshold value and the interference information indicates "0", the transmission control unit 156 performs the control of stopping the transmission of the interference information to the second radio base station 1B.

When the control of transmitting the interference information to the second radio base station 1B is performed by the transmission control unit 156, the transmission processing unit 158 transmits the interference information generated by the interference information generation unit 154 to the second radio base station 1B, under the control of the transmission control unit 156. Meanwhile, when the control of stopping the transmission of the interference information to the second radio base station 1B is performed by the transmission control unit 156, the transmission processing unit 158 stops the transmission of the interference information generated by the interference information generation unit 154 to the second radio base station 1B, under the control of the transmission control unit 156.

(Third Transmission Control)

The third transmission control is transmission control when it is regarded that an interference state in the first radio base station 1A is the same as a previous state because the second radio base station 1B periodically receives no interference information, and is transmission control of second interference information when the interference information generation unit 154 generates two pieces of continuous interference information, that is, the interference information generation unit 154 generates first interference information and continuously generates the second interference information.

Figure 3:
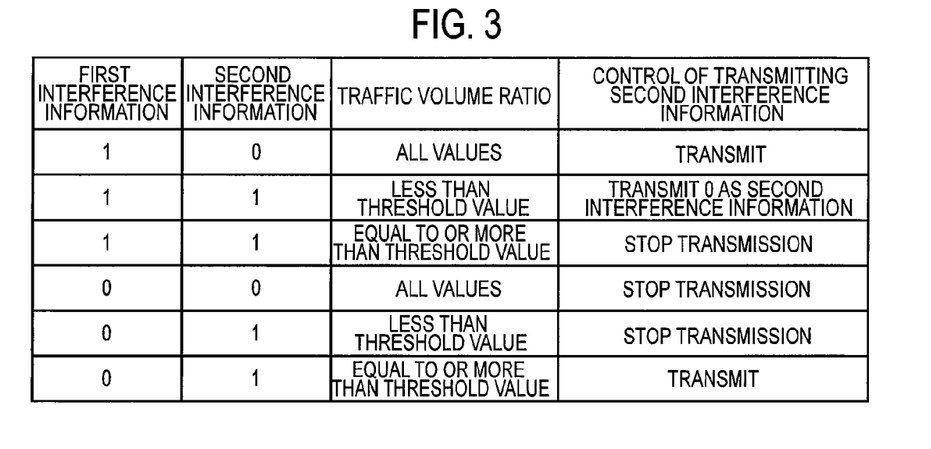
FIG. 3 is a diagram showing a correspondence relation among interference information, traffic volume ratio, and interference information transmission control according to the embodiment of the present invention.

In the third transmission control, as shown in FIG. 3, the transmission control of the second interference information is performed according to the first interference information, the second interference information, and the traffic volume ratio.

The transmission control unit 156 determines whether the first interference information indicates "1". When the first interference information indicates "1", the transmission control unit 156 further determines whether the second interference information indicates "0". When the first interference information indicates "1" and the second interference information indicates "0", it represents transition from a large interference state to a small interference state in the first radio base station 1A.

In this case, the second radio base station 1B performs the control of reducing the transmission power of the radio terminal 2B based on the fact that the first interference information or interference information, which is prior to the first interference information and is continuous to the first interference information, indicates "1". However, since there occurred the transition from the large interference state to the small interference state in the first radio base station 1A, it is not necessary to reduce the transmission power of the radio terminal 2B in order to avoid the interference. In such a case, the transmission control unit 156 performs the control of transmitting the second interference information "0" to the second radio base station 1B, regardless of the traffic volume ratio.

Meanwhile, when the first interference information indicates "1" and the second interference information indicates "1", the transmission control unit 156 determines whether the traffic volume ratio is smaller than the threshold value. When the first and second interference information indicates "1" and the traffic volume ratio is smaller than the threshold value, the second radio base station 1B performs the control of reducing the transmission power of the radio terminal 2B based on the fact that the first interference information or the interference information, which is prior to the first interference information and is continuous to the first interference information, indicates "1". However, since the traffic volume ratio is smaller than the threshold value, the first radio base station 1A changes the resource blocks to be assigned to the radio terminal 2A, so that it is possible to avoid the interference or maintain the required communication speed. Thus, it is not necessary to reduce the transmission power of the radio terminal 2B in order to avoid the interference or maintain the communication speed. In such a case, the transmission control unit 156 performs the control of changing the second interference information from "1" to "0", and transmitting "0" to the second radio base station 1B as the second interference information.

Furthermore, when the first interference information and the second interference information indicate "1" and the traffic volume ratio is equal to or more than the threshold value, the second radio base station 1B performs the control of reducing the transmission power of the radio terminal 2B based on the fact that the first interference information or the interference information, which is prior to the first interference information and is continuous to the first interference information, indicates "1". However, it is sufficient if the control is continuous. Therefore, the transmission control unit 156 performs the control of stopping the transmission of the second interference information to the second radio base station 1B.

Meanwhile, when the first interference information indicates "0", the transmission control unit 156 further determines whether the second interference information indicates "0". When the first interference information and the second interference information indicate "0", the second radio base station 1B does not perform the control of reducing the transmission power of the radio terminal 2B based on the fact that the first interference information or the interference information, which is prior to the first interference information and is continuous to the first interference information, indicates "0". However, it is sufficient if such a state is continuous. Therefore, the transmission control unit 156 performs the control of stopping the transmission of the second interference information to the second radio base station 1B.

Furthermore, when the first interference information indicates "0" and the second interference information indicates "1", the transmission control unit 156 further determines whether the traffic volume ratio is smaller than the threshold value. When the first interference information indicates "0", the second interference information indicates "1", and the traffic volume ratio is smaller than the threshold value, the second radio base station 1B does not perform the control of reducing the transmission power of the radio terminal 2B based on the fact that the first interference information or the interference information, which is prior to the first interference information and is continuous to the first interference information, indicates "0". Meanwhile, although the first radio base station 1A is interfered, the first radio base station 1A changes the resource blocks to be assigned to the radio terminal 2A, so that it is possible to avoid the interference or maintain the required communication speed. Therefore, the transmission control unit 156 performs the control of stopping the transmission of the second interference information to the second radio base station 1B.

Furthermore, when the first interference information indicates "0", the second interference information indicates "1", and the traffic volume ratio is equal to or more than the threshold value, the second radio base station 1B does not perform the control of reducing the transmission power of the radio terminal 2B based on the fact that the first interference information or the interference information, which is prior to the first interference information and is continuous to the first interference information, indicates "0". Meanwhile, since the first radio base station 1A is interfered, even though, for example, the first radio base station 1A changes the resource blocks to be assigned to the radio terminal 2A, it is difficult to avoid the interference or maintain the required communication speed. In such a case, the transmission control unit 156 performs the control of transmitting the second interference information "1" to the second radio base station 1B.

When the control of transmitting the second interference information to the second radio base station 1B is performed by the transmission control unit 156, the transmission processing unit 158 transmits the second interference information to the second radio base station 1B, under the control of the transmission control unit 156. Meanwhile, when the control of stopping the transmission of the second interference information to the second radio base station 1B is performed by the transmission control unit 156, the transmission processing unit 158 stops the transmission of the second interference information to the second radio base station 1B, under the control of the transmission control unit 156.

(1.3) Configuration of Second Radio Base Station 1B

Figure 4:
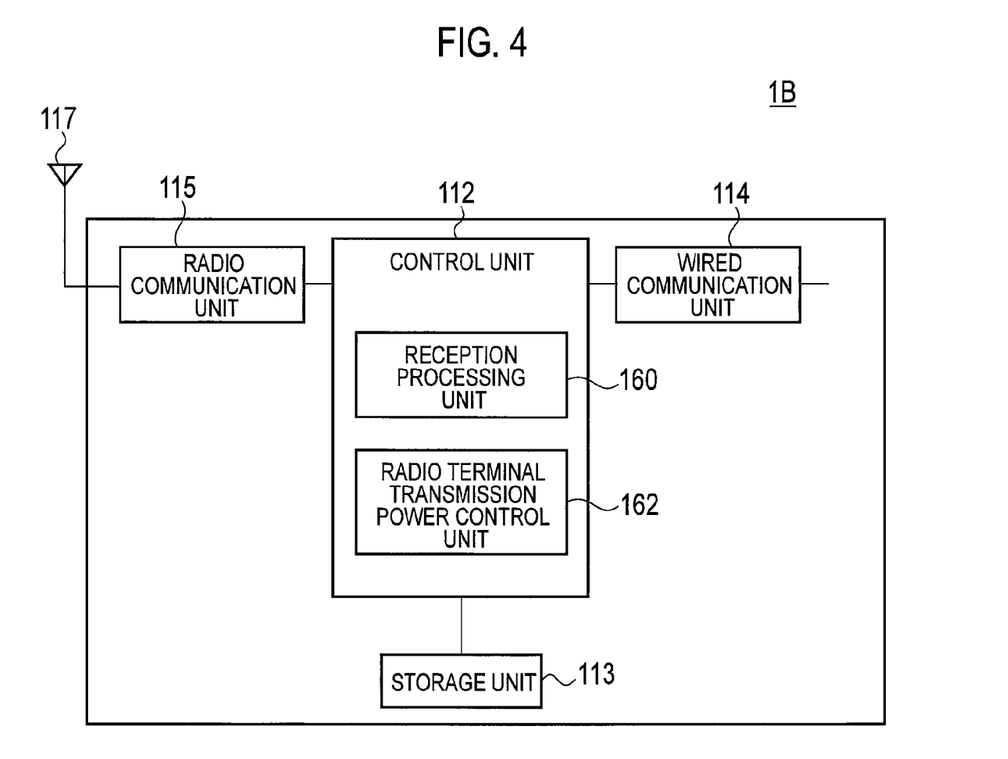
FIG. 4 is a configuration diagram of a second radio base station according to the embodiment of the present invention.

FIG. 4 is a block diagram showing the configuration of the second radio base station 1B. As shown in FIG. 4, the second radio base station 1B includes a control unit 112, a storage unit 113, a wired communication unit 114, a radio communication unit 115, and an antenna unit 117.

The control unit 112, for example, is configured by CPU, and controls various functions of the second radio base station 1B. The storage unit 113, for example, is configured by a memory, and stores various types of information used for the control and the like of the second radio base station 1B.

The wired communication unit 114 is configured to transmit and receive data to and from the first radio base station 1A. The radio communication unit 115, for example, is configured using a radio frequency (RF) circuit, a baseband (BB) circuit and the like, and transmits and receives a radio signal to and from the radio terminal 2B through the antenna unit 117. Furthermore, the radio communication unit 115 is configured to encode and modulate a transmission signal, and demodulate and decode a reception signal. Moreover, the radio communication unit 115 is configured to output reception data, which is obtained by demodulating and decoding the reception signal, to the control unit 112.

The control unit 112 includes a reception processing unit 160 and a radio terminal transmission power control unit 162.

The reception processing unit 160 of the control unit 112 is configured to receive the interference information of each resource block from the first radio base station 1A through the wired communication unit 114.

The radio terminal transmission power control unit 162 of the control unit 112 is configured to control the transmission power of the radio terminal 2B based on the interference information of each resource block received in the reception processing unit 160.

Specifically, the radio terminal transmission power control unit 162 is configured to specify the radio terminal 2B, which is subject to transmission power control, based on the identification information of the radio terminal 2B added to the interference information of each resource block received in the reception processing unit 160.

Next, when the interference information indicates "1", the radio terminal transmission power control unit 162 generates a reduction request of transmission power including the identification information of the resource block having the interference information added thereto.

Moreover, the radio terminal transmission power control unit 162 is configured to transmit the generated reduction request of transmission power to the radio terminal 2B through the radio communication unit 115 and the antenna unit 117. When the reduction request of transmission power is received, the radio terminal 2B reduces transmission power with respect to a resource block corresponding to the identification information of the resource block added to the reduction request of transmission power.

Meanwhile, when the interference information indicates "0", if the transmission power of the radio terminal 2B has been reduced at the current time point, the radio terminal transmission power control unit 162 generates a cancel request of transmission power reduction including the identification information of the resource block having the interference information added thereto.

Moreover, the radio terminal transmission power control unit 162 is configured to transmit the generated cancel request of transmission power reduction to the radio terminal 2B through the radio communication unit 115 and the antenna unit 117. When the cancel request of transmission power reduction is received, the radio terminal 2B cancels the reduction of transmission power with respect to a resource block corresponding to the identification information of the resource block added to the cancel request of transmission power reduction.

Meanwhile, when the interference information indicates "0", if the transmission power of the radio terminal 2B has not been reduced at the current time point, the radio terminal transmission power control unit 162 stops the control regarding the transmission power of the radio terminal 2B.

Figure 5:
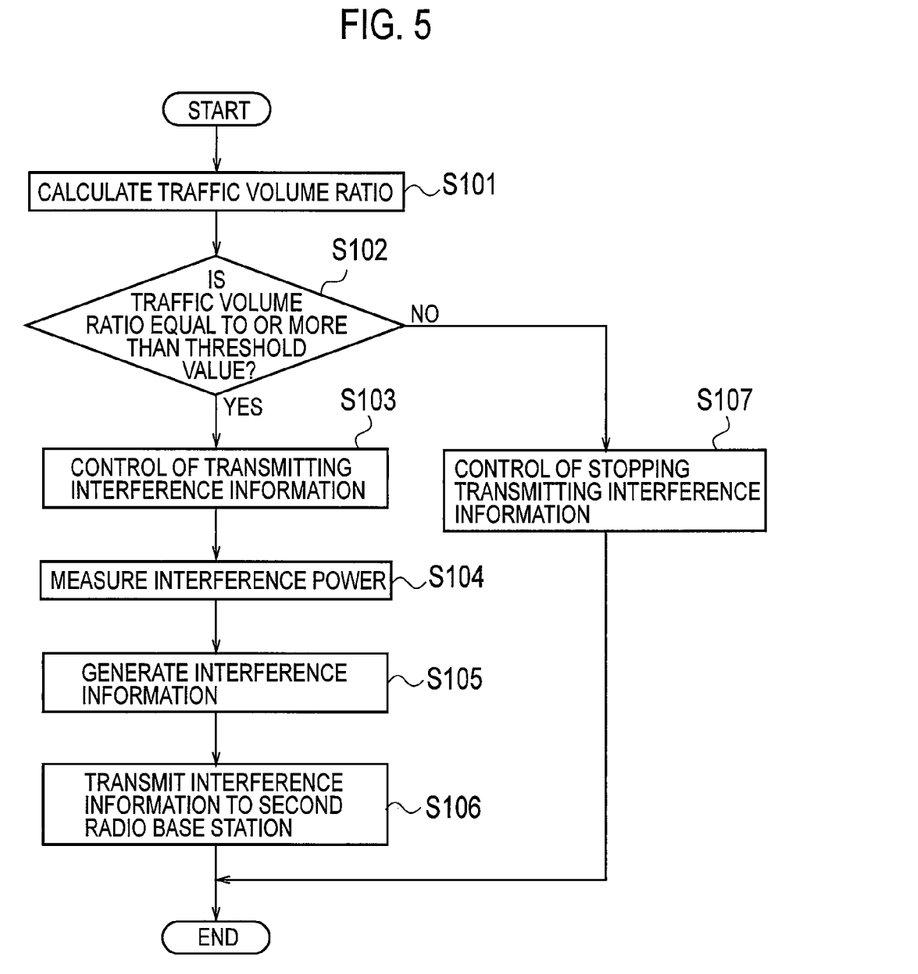
FIG. 5 is a flowchart showing a first operation of the first radio base station according to the embodiment of the present invention.

(2) Operation of Radio Base Station (2.1) Operation of First Radio Base Station 1A FIG. 5 is a flowchart showing the operation of the first radio base station 1A when the first transmission control is performed. In step S101, while the first radio base station 1A is receiving radio signals transmitted from the radio terminal 2A through the first uplink, the communication load measurement unit 152 of the control unit 102 calculates the ratio (the traffic volume ratio) of the actual traffic volume with respect to the maximum traffic volume which is processible by the first radio base station 1A.

In step S102, the transmission control unit 156 of the control unit 102 determines whether the traffic volume ratio is equal to or more than the threshold value.

When the traffic volume ratio is equal to or more than the threshold value, the transmission control unit 156 performs the control of transmitting the interference information to the second radio base station 1B in step S103. Under the control, in step S104, the interference power measurement unit 150 of the radio communication unit 105 measures the power of the interference, which is caused by the radio signals transmitted from the ratio terminal 2B to the second radio base station 1B through the second uplink, in each resource block assigned to the radio terminal 2A, while the first radio base station 1A is receiving the radio signals transmitted from the ratio terminal 2A through the first uplink.

In step S105, the interference information generation unit 154 of the control unit 102 generates the interference information of two values, which indicate "0" and "1", based on the interference power value of each resource block.

In step S106, the transmission processing unit 158 of the control unit 102 transmits the generated interference information to the second radio base station 1B.

Meanwhile, when it is determined that the traffic volume ratio is smaller than the threshold value in step S102, the transmission control unit 156 performs the control of stopping the transmission of the interference information to the second radio base station 1B in step S107.

Figure 6:
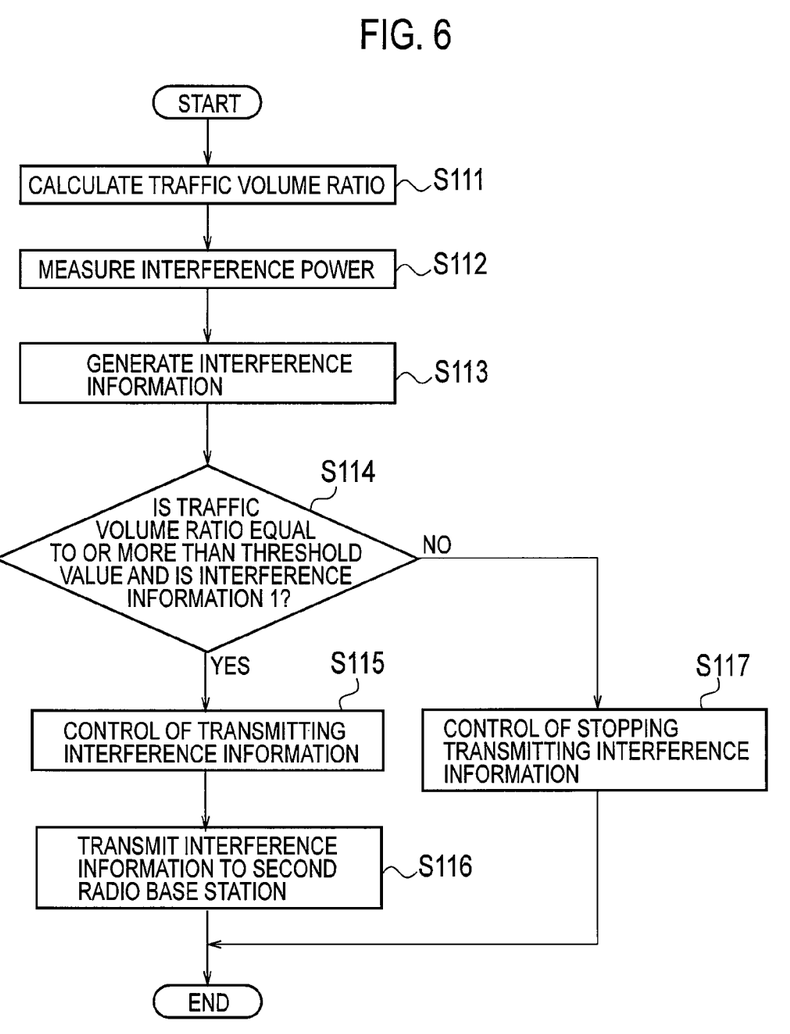
FIG. 6 is a flowchart showing a second operation of the first radio base station according to the embodiment of the present invention.

FIG. 6 is a flowchart showing the operation of the first radio base station 1A when the second communication control is performed. In step S111, while the first radio base station 1A is receiving radio signals transmitted from the radio terminal 2A through the first uplink, the communication load measurement unit 152 of the control unit 102 calculates the ratio (the traffic volume ratio) of the actual traffic volume with respect to the maximum traffic volume which is processible by the first radio base station 1A.

In step S112, the interference power measurement unit 150 in the radio communication unit 105, measures the power of the interference, which is caused by the radio signals transmitted from the ratio terminal 2B to the second radio base station 1B through the second uplink, in each resource block assigned to the radio terminal 2A, while the first radio base station 1A is receiving the radio signals transmitted from the ratio terminal 2A through the first uplink.

In step S113, the interference information generation unit 154 of the control unit 102 generates the interference information of two values, which indicate "0" and "1", based on the interference power value of each resource block.

In step S114, the transmission control unit 156 of the control unit 102 determines whether the traffic volume ratio calculated in step S111 is equal to or more than the threshold value and the interference information generated in step S113 indicates "1".

When the traffic volume ratio is equal to or more than the threshold value and the interference information indicates "1", the transmission control unit 156 performs the control of transmitting the interference information to the second radio base station 1B in step S115.

In step S116, the transmission processing unit 158 of the control unit 102 transmits the interference information generated in step S113 to the second radio base station 1B.

Meanwhile, it is determined that any one of conditions is satisfied in step S114, the conditions are that the traffic volume ratio is less than the threshold value and that the interference information indicates "0", the transmission control unit 156 performs the control of stopping the transmission of the interference information to the second radio base station 1B in step S117.

Figure 7:
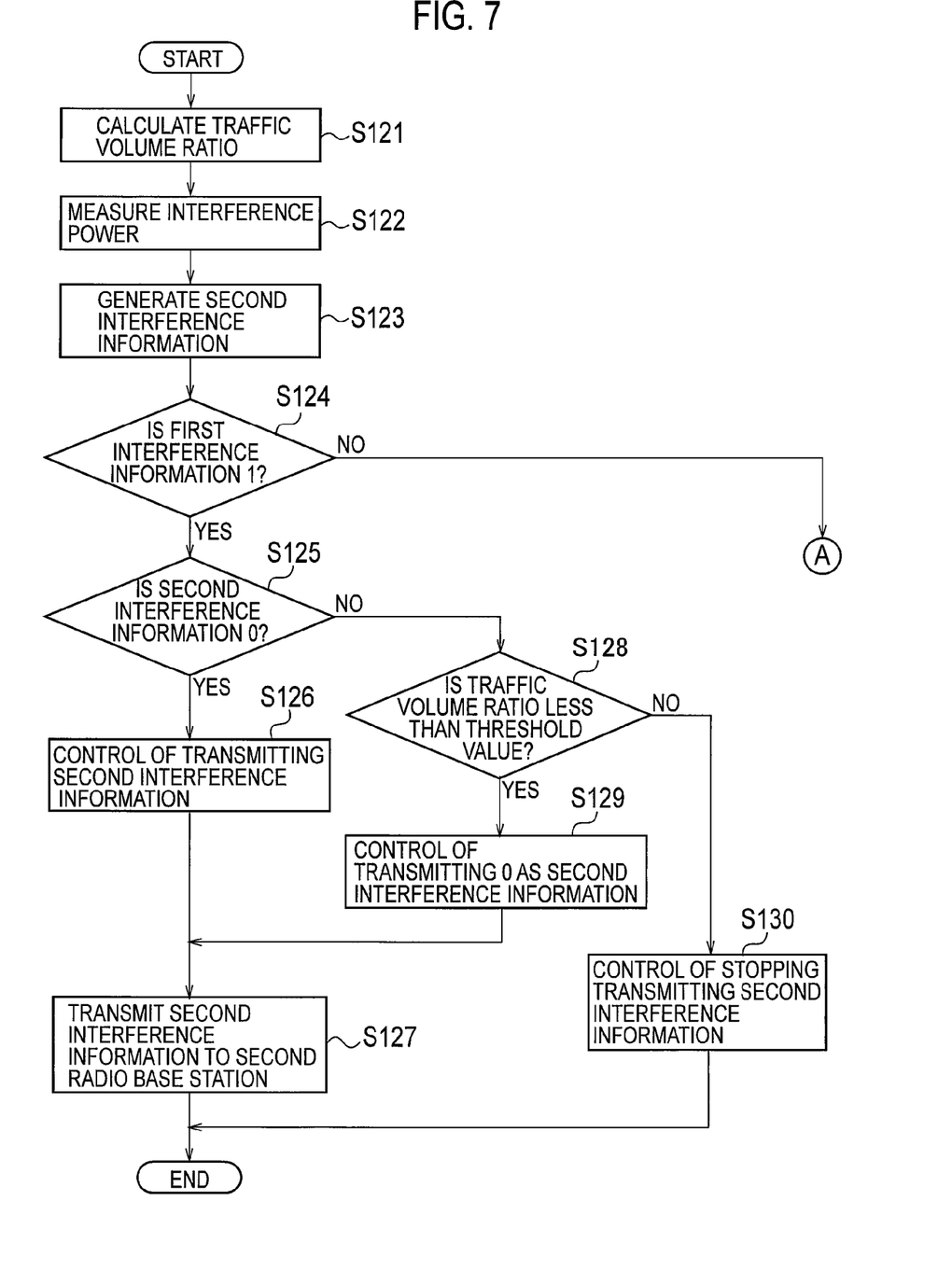
FIG. 7 is a first flowchart showing a third operation of the first radio base station according to the embodiment of the present invention.
Figure 8:
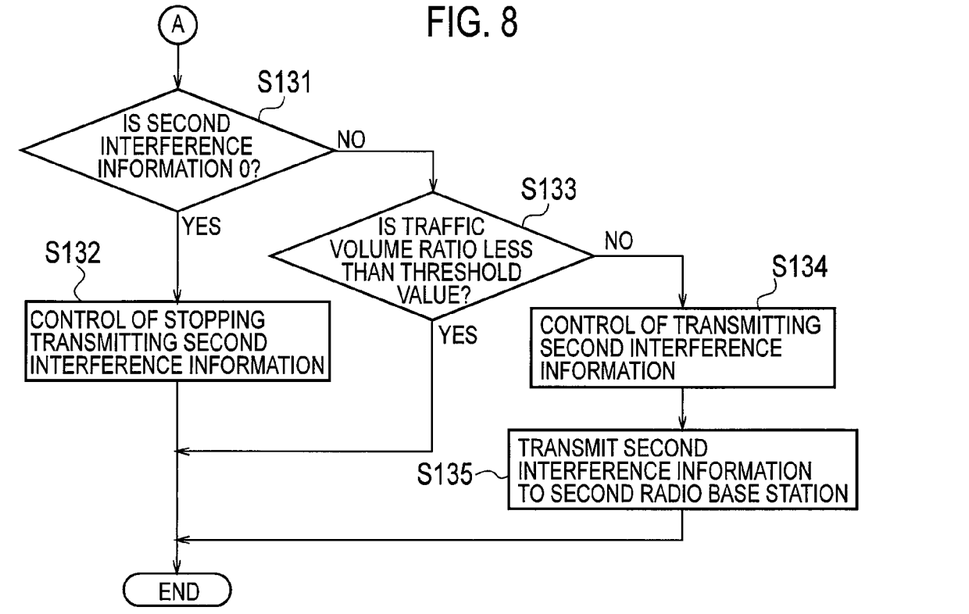
FIG. 8 is a second flowchart showing the third operation of the first radio base station according to the embodiment of the present invention.

FIG. 7 and FIG. 8 are flowcharts showing the operation of the first radio base station 1A when the third transmission control is performed. In step S121, while the first radio base station 1A is receiving radio signals transmitted from the radio terminal 2A through the first uplink, the communication load measurement unit 152 of the control unit 102 calculates the ratio (the traffic volume ratio) of the actual traffic volume with respect to the maximum traffic volume which is processible by the first radio base station 1A.

In step S122, the interference power measurement unit 150 in the radio communication unit 105, measures the power of the interference, which is caused by the radio signals transmitted from the ratio terminal 2B to the second radio base station 1B through the second uplink, in each resource block assigned to the radio terminal 2A, while the first radio base station 1A is receiving the radio signals transmitted from the ratio terminal 2A through the first uplink.

In step S123, the interference information generation unit 154 of the control unit 102 generates the second interference information of two values, which indicate "0" and "1", based on the interference power value of each resource block.

In step S124, the transmission control unit 156 of the control unit 102 determines whether the first interference information generated just before the second interference information indicates "1". When the first interference information indicates "1", the transmission control unit 156 determines whether the second interference information indicates "0" in step S125.

When the second interference information indicates "0", the transmission control unit 156 performs the control of transmitting the interference information to the second radio base station 1B in step S126. In step S127, the transmission processing unit 158 of the control unit 102 transmits the second interference information generated in step S123 to the second radio base station 1B.

Meanwhile, when it is determined that the second interference information indicates "1" in step S125, the transmission control unit 156 determines whether the traffic volume ratio calculated in step S121 is smaller than the threshold value in step S128.

When the traffic volume ratio is smaller than the threshold value, the transmission control unit 156 performs the control of transmitting "0" to the second radio base station 1B as the second interference information in step S129. In step S127, the transmission processing unit 158 of the control unit 102 transmits "0" corresponding to the second interference information to the second radio base station 1B.

Meanwhile, when the traffic volume ratio is equal to or more than the threshold value, the transmission control unit 156 performs the control of stopping the transmission of the interference information to the second radio base station 1B in step S130.

Meanwhile, when it is determined that the first interference information indicates "0" in step S124, the procedure proceeds to an operation of FIG. 8, and the transmission control unit 156 determines whether the second interference information indicates "0" in step S131.

When the second interference information indicates "0", the transmission control unit 156 performs the control of stopping the transmission of the interference information to the second radio base station 1B in step S132.

Meanwhile, when the second interference information indicates "1", the transmission control unit 156 determines whether the traffic volume ratio calculated in step S121 is smaller than the threshold value.

When the traffic volume ratio is smaller than the threshold value, the transmission control unit 156 performs the control of stopping the transmission of the interference information to the second radio base station 1B in step S132.

Meanwhile, when the traffic volume ratio is equal to or more than the threshold value, the transmission control unit 156 performs the control of transmitting the second interference information to the second radio base station 1B in step S134. In step S135, the transmission processing unit 158 transmits the second interference information to the second radio base station 1B.

(2.2) Operation of Second Radio Base Station 1B

Figure 9:
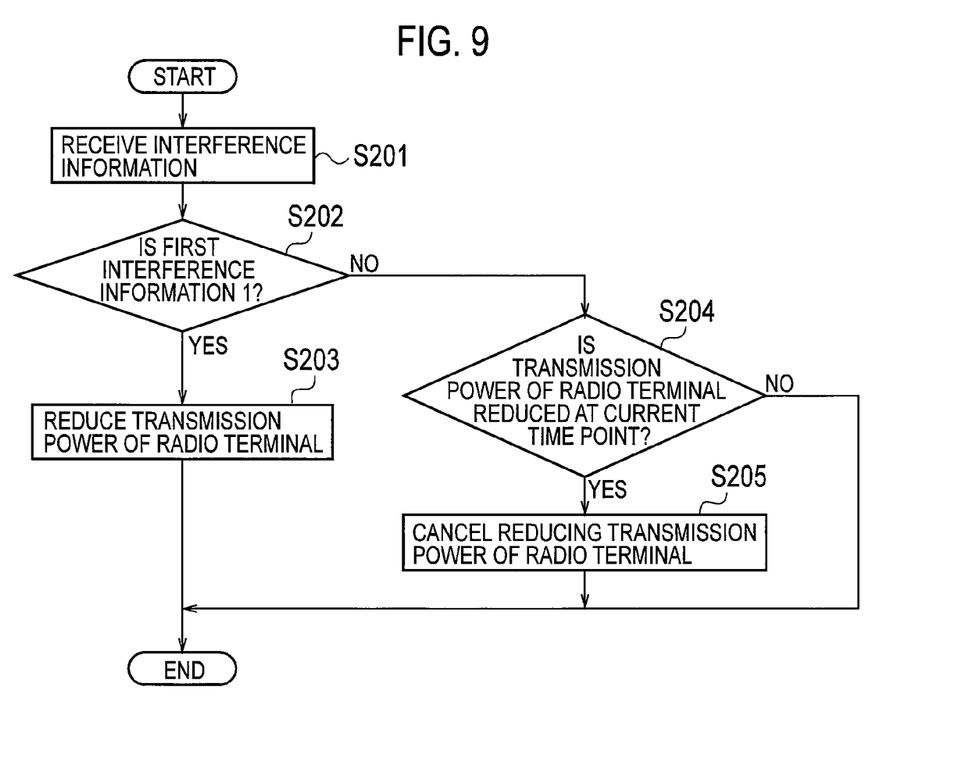
FIG. 9 is a flowchart showing an operation of the second radio base station according to the embodiment of the present invention.

FIG. 9 is a flowchart showing the operation of the second radio base station 1B. In step S201, the reception processing unit 160 of the control unit 112 receives the interference information of each resource block from the first radio base station 1A.

In step S202, the radio terminal transmission power control unit 162 of the control unit 112 determines whether the received interference information indicates "1".

When the interference information indicates "1", the radio terminal transmission power control unit 162 performs the control of reducing the transmission power of the radio terminal 2B in step S203.

Meanwhile, when the interference information indicates "0", the radio terminal transmission power control unit 162 determines whether the transmission power of the radio terminal 2B has been reduced at the present time point in step S204. When the transmission power of the radio terminal 2B has been reduced at the present time point, the radio terminal transmission power control unit 162 performs the control of cancelling the reduction of the transmission power of the radio terminal 2B in step S205.

(3) Operation and Effect

In the radio communication system 10 according to the present embodiment, the first radio base station 1A calculates the traffic volume ratio in the first radio base station 1A.

In the first transmission control, when the traffic volume ratio is equal to or more than the threshold value, the first radio base station 1A performs the control of transmitting the interference information. Under the control, the first radio base station 1A performs the measurement of the interference power, the generation of the interference information, and the transmission of the interference information to the second radio base station 1B. Meanwhile, when the traffic volume ratio is less than the threshold value, the first radio base station 1A performs the control of stopping the transmission of the interference information. Under the control, the first radio base station 1A performs neither the measurement of the interference power, the generation of the interference information, nor the transmission of the interference information to the second radio base station 1B.

When the traffic volume ratio corresponding to the load of the radio communication in the first radio base station 1A is low, even though the transmission power of the radio terminal 2B causing interference is not reduced, resource blocks to be assigned to the radio terminal 2A are changed, for example, so that it is possible to avoid the interference. Consequently, when the traffic volume ratio is equal to or more than the threshold value, the first radio base station 1A transmits the interference information to the second radio base station 1B, thereby preventing a reduction of the overall communication capacity of the radio communication system 10 due to a reduction of the transmission power of the radio terminal 2B more than necessary.

Furthermore, only when the control of transmitting the interference information is performed, since the measurement of the interference power and the generation of the interference information are performed, a processing load of the first radio base station 1A is reduced.

Furthermore, in the second transmission control, when the traffic volume ratio is equal to or more than the threshold value and the interference information indicates "1", the first radio base station 1A performs the control of transmitting the interference information. When any one of the conditions is satisfied, the conditions are that the traffic volume ratio is less than the threshold value and the interference information indicates "0", the first radio base station 1A performs the control of stopping the transmission of the interference information.

In the second transmission control corresponding to the transmission control when it is regarded that no interference occurs in the first radio base station 1A because the second radio base station 1B periodically receives no interference information, when any one of conditions is satisfied, the conditions are that the traffic volume ratio is less than the threshold value and that the interference information indicates "0", it is not necessary to suppress interference by reducing the transmission power of the radio terminal 2B, and the second radio base station 1B may regard that no interference occurs in the first radio base station 1A. Consequently, only when the traffic volume ratio is equal to or more than the threshold value and the interference information indicates "1", the first radio base station 1A transmits the interference information, so that unnecessary transmission of the interference information is reduced and a processing load and a communication load are reduced, thereby preventing a reduction of the overall communication capacity of the radio communication system 10 due to a reduction of the transmission power of the radio terminal 2B more than necessary.

Furthermore, in the third transmission control, the first radio base station 1A performs the transmission control of the second interference information according to the correspondence relation among the first interference information, the second interference information, and the traffic volume ratio as shown in FIG. 3.

In the third transmission control corresponding to the transmission control when it is regarded that an interference state in the first radio base station 1A is the same as a previous state because the second radio base station 1B periodically receives no interference information, the transmission control of the second interference information is performed according to the correspondence relation among the first interference information, the second interference information, and the traffic volume ratio as shown in FIG. 3, so that the unnecessary transmission of the interference information is reduced and unnecessary processing load and unnecessary communication load are reduced, thereby preventing a reduction of the overall communication capacity of the radio communication system 10 due to a reduction of the transmission power of the radio terminal 2B more than necessary.

(4) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art based on this disclosure.

In the embodiment, the first radio base station 1A measures interference power of each resource block, and further generates and transmits interference information. However, the first radio base station 1A may calculate an average value of interference power of all resource blocks assigned to the radio terminal 2A, and generate and transmit one piece of interference information corresponding to the average value of the interference power. In this case, the second radio base station 1B controls the transmission power of the radio terminal 2B based on the one piece of interference information, in other words, interference information corresponding to all resource blocks assigned to the radio terminal 2A.

Furthermore, the load of the radio communication is not limited to the traffic volume ratio in the first radio base station 1A. For example, the load may include a use rate of resource blocks in the first radio base station 1A, the traffic volume itself in the first radio base station 1A, a load of processing performed in the radio communication in the first radio base station 1A, and the like.

Furthermore, in the embodiment, the radio communication system 10 has a configuration based on the LTE Release 9 or the LTE-Advanced. However, the radio communication system 10 may have configurations based on other communication standards.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-030415 (filed on Feb. 15, 2010) is incorporated in the present specification by reference.

INDUSTRIAL APPLICABILITY

The radio base station and the communication control method of the present invention can prevent a reduction of the overall communication capacity of a radio communication system, and is useful as a radio base station and a communication control method.

The invention claimed is:

1. A radio base station, which performs a process of allowing an other radio base station to control interference from a radio terminal connected to the other radio base station, comprising:
an interference information transmission control unit configured to control transmission of interference information to the other radio base station based on a load of radio communication in the radio base station, the interference information being associated with interference power from the radio terminal,
wherein the interference information transmission control unit
performs the control of transmitting the interference information when a value indicating the load of the radio communication is equal to or more than a threshold value and the interference information corresponds to a first index value indicating that the corresponding interference power is equal to or more than a predetermined value, and
performs the control of stopping the transmission of the interference information when any one of conditions is satisfied, the conditions being that the value indicating the load of the radio communication is less than the threshold value and that the interference information is a second index value indicating that the corresponding interference power is less than the predetermined value.

2. The radio base station according to claim 1, wherein the interference information transmission control unit performs control of transmitting the interference information when a value indicating the load of radio communication is equal to or more than a threshold value, and performs control of stopping transmission of the interference information when the value indicating the load of radio communication is smaller than the threshold value.

3. The radio base station according to claim 1, further comprising:
an interference information generation unit configured to generate the interference information, wherein
the interference information generation unit generates the interference information when the control of transmitting the interference information is performed by the interference information transmission control unit, and stops generation of the interference information when the control of stopping the transmission of the interference information is performed by the interference information transmission control unit.

4. The radio base station according to claim 1, further comprising:
an interference power measurement unit configured to measure the interference power, wherein
the interference power measurement unit measures the interference power when the control of transmitting the interference information is performed by the interference information transmission control unit, and stops measurement of the interference power when the control of stopping the transmission of the interference information is performed by the interference information transmission control unit.

5. A radio base station, which performs a process of allowing an other radio base station to control interference from a radio terminal connected to the other radio base station, comprising:
an interference information transmission control unit configured to control transmission of interference information to the other radio base station based on a load of radio communication in the radio base station, the interference information being associated with interference power from the radio terminal; and
an interference information generation unit configured to generate first interference information and second interference information, wherein the interference information transmission control unit:
performs control of transmitting the second interference information when the first interference information corresponds to a first index value indicating that the corresponding interference power is equal to or more than a predetermined value and the second interference information corresponds to a second index value indicating that the corresponding interference power is smaller than the predetermined value,
performs the control of transmitting the second index value as the second interference information when the first interference information corresponds to the first index value, the second interference information corresponds to the first index value, and the value indicating the load of the radio communication is smaller than the threshold value,
performs control of stopping transmission of the second interference information when the first interference information corresponds to the first index value, the second interference information corresponds to the first index value, and the value indicating the load of the radio communication is equal to or more than the threshold value,
performs the control of stopping the transmission of the second interference information when the first interference information corresponds to the second index value and the second interference information corresponds to the second index value,
performs the control of stopping the transmission of the second interference information when the first interference information corresponds to the second index value, the second interference information corresponds to the first index value, and the value indicating the load of the radio communication is smaller than the threshold value, and
performs the control of transmitting the second interference information when the first interference information corresponds to the second index value, the second interference information corresponds to the first index value, and the value indicating the load of the radio communication is equal to or more than the threshold value.

6. A communication control method in a radio base station, which performs a process of allowing an other radio base station to control interference from a radio terminal connected to the other radio base station, comprising:
a step of measuring, at the radio base station, a load of radio communication in the radio base station;
a step of measuring, at the radio base station, interference power from the radio terminal;
a step of generating, at the radio base station, interference information associated with the measured interference power; and
a step of controlling, at the radio base station, transmission of the generated interference information to the other radio base station based on the measured load of the radio communication,
wherein the generated interference information is transmitted when a value indicating the load of the radio communication is equal to or more than a threshold value and the interference information corresponds to a first index value indicating that the corresponding interference power is equal to or more than a predetermined value, and
transmission of the generated interference information is stopped when any one of conditions is satisfied, the conditions being that the value indicating the load of the radio communication is less than the threshold value and that the interference information is a second index value indicating that the corresponding interference power is less than the predetermined value.

* * * * *